United States Patent
Kakutani

(10) Patent No.: US 9,110,435 B2
(45) Date of Patent: Aug. 18, 2015

(54) DEVICE CAPABLE OF EXTRACTING OUTPUT CONTROL INFORMATION, CONTROL METHOD THEREOF, AND STORAGE MEDIUM

(75) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 13/118,923

(22) Filed: May 31, 2011

(65) Prior Publication Data

US 2011/0304879 A1 Dec. 15, 2011

(30) Foreign Application Priority Data

Jun. 10, 2010 (JP) ................. 2010-132908

(51) Int. Cl.
| | |
|---|---|
| G06F 3/12 | (2006.01) |
| G06K 15/00 | (2006.01) |
| H04N 1/00 | (2006.01) |
| H04N 1/46 | (2006.01) |
| G06K 7/10 | (2006.01) |
| G03G 21/04 | (2006.01) |

(52) U.S. Cl.
CPC ......... *G03G 21/046* (2013.01); *H04N 1/00846* (2013.01); *H04N 1/00875* (2013.01)

(58) Field of Classification Search
CPC ............... H04N 2201/04703; H04N 1/00758; H04N 1/00334; H04N 1/00846; H04N 1/00859; H04N 1/00875; H04N 1/346; H04N 2201/3269; H04N 2201/0094; G06T 2207/10008

USPC ............... 358/1.15, 1.14, 408, 474, 488, 505; 235/462.09

See application file for complete search history.

(56) References Cited

U.S. PATENT DOCUMENTS

| | | | |
|---|---|---|---|
| 2007/0228171 A1* | 10/2007 | Thiyagarajah | 235/462.09 |
| 2008/0080020 A1* | 4/2008 | Shimasaki et al. | 358/474 |
| 2008/0100885 A1* | 5/2008 | Onishi | 358/488 |
| 2008/0232639 A1* | 9/2008 | Ishikawa et al. | 382/100 |
| 2008/0283609 A1* | 11/2008 | Nakajima et al. | 235/462.07 |
| 2009/0021784 A1* | 1/2009 | Hoshii et al. | 358/1.15 |
| 2009/0103771 A1 | 4/2009 | Kamio | |
| 2009/0193525 A1* | 7/2009 | Mitome | 726/30 |
| 2010/0060923 A1 | 3/2010 | Kakutani | |
| 2010/0140362 A1* | 6/2010 | Tokumaru | 235/494 |
| 2010/0188682 A1* | 7/2010 | Shirai | 358/1.13 |
| 2011/0181909 A1* | 7/2011 | Kakoi | 358/1.15 |

FOREIGN PATENT DOCUMENTS

| | | |
|---|---|---|
| JP | 04-009963 | 1/1992 |
| JP | 10-312447 | 11/1998 |
| JP | 2001-218008 A | 8/2001 |
| JP | 2009105529 A | 5/2009 |

* cited by examiner

*Primary Examiner* — Thomas Lett
(74) *Attorney, Agent, or Firm* — Fitzpatrick, Cella, Harper & Scinto

(57) ABSTRACT

To change a detection target region of output control information for each function to be used in an MFP having multiple functions. A device that outputs document data has a detection unit configured to detect, from document data, information to control output of the document data and a control unit configured to control the output of the document data according to the detected information, and the device includes a setting unit configured to set a detection target region by the detection unit either to the entire surface or to a specific region of the document data.

7 Claims, 14 Drawing Sheets

DETECTION TARGET REGION SETTING

| | | | |
|---|---|---|---|
| FLATBED | COPY | ○ ENTIRE DOCUMENT SURFACE  ● SPECIFY REGION | SET DETAILS |
| | STORAGE SAVE | ○ ENTIRE DOCUMENT SURFACE  ● SPECIFY REGION | SET DETAILS |
| | SEND | ● ENTIRE DOCUMENT SURFACE  ○ SPECIFY REGION | SET DETAILS |
| | FAX | ● ENTIRE DOCUMENT SURFACE  ○ SPECIFY REGION | SET DETAILS |
| SHEET FEED | COPY | ○ ENTIRE DOCUMENT SURFACE  ● SPECIFY REGION | SET DETAILS |
| | STORAGE SAVE | ○ ENTIRE DOCUMENT SURFACE  ● SPECIFY REGION | SET DETAILS |
| | SEND | ○ ENTIRE DOCUMENT SURFACE  ● SPECIFY REGION | SET DETAILS |
| | FAX | ○ ENTIRE DOCUMENT SURFACE  ● SPECIFY REGION | SET DETAILS |

FIG.11

DEVICE CAPABLE OF EXTRACTING OUTPUT CONTROL INFORMATION, CONTROL METHOD THEREOF, AND STORAGE MEDIUM

BACKGROUND OF THE INVENTION

1. Field of the Invention

The present invention relates to a device capable of extracting output control information, a control method thereof, and a storage medium.

2. Description of the Related Art

In recent years, along with the spread of MFPs (Multifunction Peripherals), a problem of unauthorized output of document is increasing. As countermeasure technology for the problem, there is, for example, technology to suppress copy of a specific document and as the copy suppression technology, mention is made of the following methods.

For example, Japanese Patent Laid-Open No. H04-009963 (1992) discloses a method which attaches copy inhibit information to a document in advance and inhibits copy of the document when a copy machine reads the document and detects the copy inhibit information.

As an example of a code that includes copy inhibit information and is embedded in a document, there is a QR code (registered trademark) disclosed in Japanese Patent Laid-Open No. H10-312447 (1998). The QR code described in Japanese Patent Laid-Open No. H10-312447(1998) is used more widely compared to the one-dimensional barcode used in Japanese Patent Laid-Open No. H04-009963(1992).

Because the two-dimensional code, such as the QR code, is a quadrangular code and the code itself has high visibility, the readability of the document itself is reduced unless the position where the code is attached on the document is taken into consideration. Hence, such a two-dimensional code is often used being attached to a specifically fixed position on a document.

When the MFP capable of controlling output based on output control information, such as copy inhibit information, detects output control information, such as a two-dimensional code attached to a document, much time is required for image processing for detection when the detection target region is the entire surface of the document. On the other hand, when the position where output control information is attached is limited in advance and only a specific region is the detection target, time required for image processing for detection is less, however, a risk that output control information cannot be detected because of the misalignment of the document when it is set on a reading unit is increased.

In such circumstances as described above, for example, when the copy function is used, there may be a demand to limit the detection target region of output control information to only a specific region, giving priority to performance. On the other hand, when the FAX function is used, there may be a demand to set the entire surface of a document as the detection target region, giving priority to the precision of detection of output control information from the viewpoint of avoiding the risk that information leaks out. These demands are in a trade-off relationship and it is desired to change the detection target region of output control information for each function used of the MFP.

SUMMARY OF THE INVENTION

A device according to the present invention is a device that outputs document data, having a detection unit configured to detect information to control output of the document data and a control unit configured to control output of the document data according to the detected information, characterized by including a setting unit configured to set a detection target region by the detection unit either to the entire surface or to a specific region of the document data.

According to the present invention, it is possible to change the detection target region of output control information for each function used of the MFP. Due to this, it is made possible to perform flexible operation of the output control function of the MFP.

Further features of the present invention will become apparent from the following description of exemplary embodiments (with reference to the attached drawings).

BRIEF DESCRIPTION OF THE DRAWINGS

FIG. 11 is a diagram showing an example of a setting screen to specify a detection target region of a QR code for each reading system in a third embodiment.

DESCRIPTION OF THE EMBODIMENTS

Figure 1:
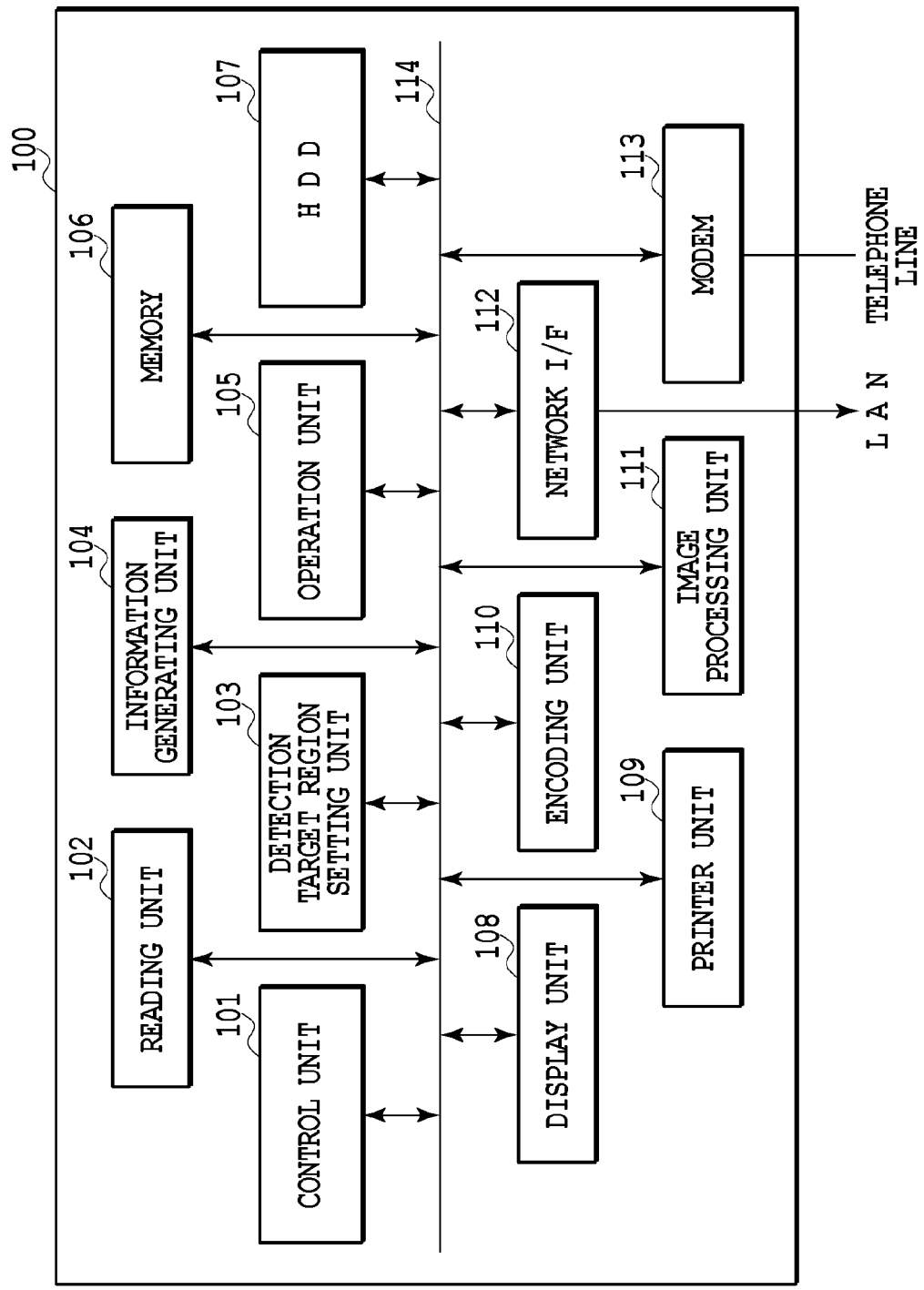
FIG. 1 is a block diagram showing an example of a configuration of an MFP according to the present invention.

Preferred embodiments of the present invention will be described below in detail with reference to the attached drawings. Before the explanation of the specific embodiments, terms etc. used in the present specification are explained.

First, "document" in the present specification means a paper document, such as a print. Then, "document data" means image data obtained by scanning a document with a scanner etc. To a document, coded output control information to control output of the document data is attached. Hereinafter, explanation is given on the assumption that the contents of "output" here refer to the following four functions, which are typical functions of the MFP, however, the functions comprised by the MFP to which the present invention can be applied are not limited to those.

COPY function: A function to print document data obtained by reading a document on a recording medium such as paper.

STORAGE SAVE function: A function to store/save document data obtained by reading a document in a storage such as HDD. This function is also referred to as a box scan function.

SEND function: A function to transmit document data obtained by reading a document to another external device via a network.

FAX function: A function to fax document data obtained by reading a document via a telephone line.

Output control information includes two kinds of information, that is, output inhibit information, which is information indicative of inhibition of output, and output permit information, which is information indicative of permission of output. Further, there can be, for example, conditional output permit information, which is conditioned permission of output.

Next, a document having coded output control information (two-dimensional code) is explained.

In order to obtain a two-dimensional code-attached document, it is necessary to obtain information to be embedded by encoding output control information. At the time of encoding, data for error correction is also added, and therefore, the generated information to be embedded includes information of error correction code that is not present in the output control information itself as a result. Then, a two-dimensional code is generated by imaging the obtained information to be embedded. Finally, by combining the generated two-dimensional code with the document data and printing it, a two-dimensional code-attached document is obtained.

In each of the embodiments described below, it is assumed that a QR code is used as a specific example of a two-dimensional code and one QR code is attached to each page of a document. It is also assumed that the position where a QR code is attached is limited within a region in the four corners of a document in the shape of a rectangle with 30 mm sides.

Next, extraction of output control information from such a QR code-attached document as described above is explained.

In order to extract output control information from a QR code-attached document, first, it is necessary to read the document set on a document table (platen) or ADF (Auto Document Feeder) to obtain document data. Then, a finder pattern (a rectangular cutout symbol in three corners of the QR code) of the QR code is detected in the image of the obtained document data. If the finder pattern is detected, it is known that there exists a QR code in the image of the document data and it is possible to identify its position. Then, by generating information from the detected QR code, the embedded information is obtained. Finally, by decoding the obtained embedded information, output control information is extracted.

First Embodiment

FIG. 1 is a block diagram showing an example of a configuration of an MFP 100 according to the present invention. Reference numeral 101 represents a control unit that totally controls each unit, to be described below. The control unit 101 has a CPU, not shown schematically. Further, the control unit 101 also decodes embedded information etc.

Reference numeral 102 represents a reading unit that reads (scans) a document, which is a paper document such as a print, and generates document data.

Reference numeral 103 represents a detection target region setting unit that sets a region in which a QR code is detected in the image of the document data generated in the reading unit 102.

Reference numeral 104 is an information generating unit that checks the target region set in the detection target region setting unit 103 for the presence/absence of a QR code. When a QR code is detected, the information generating unit 104 performs processing to generate information from the QR code.

Reference numeral 105 represents an operation unit that serves as a user interface receiving an operation input from a user to the MFP 100.

Reference numeral 106 represents a memory including ROM or RAM which stores various commands (OS or application program) executed in the CPU to control the MFP 100 and the execution results etc. Further, the memory 106 is also used to temporarily store various kinds of data such as document data.

Reference numeral 107 represents an HDD that is used to save various kinds of data such as document data besides the printing setting or use log of the MFP 100.

Reference numeral 108 represents a display unit that displays various kinds of information to a user.

Reference numeral 109 represents a printer unit that performs processing to print and output on a recording medium such as paper based on document data.

Reference numeral 110 represents an encoding unit that performs the above-mentioned encoding and imaging.

Reference numeral 111 represents an image processing unit that performs processing to combine a QR code and document data as well as general image processing such as halftoning.

Reference numeral 112 represents a network interface. The MFP 100 is connected to an external device via a network such as LAN. As an external device, mention is made, for example, of a PC.

Reference numeral 113 represents a modem and is connected with a telephone line.

Reference numeral 114 represents a bus that connects each unit described above.

Next, creation of a QR code-attached document is explained.

Figure 3:
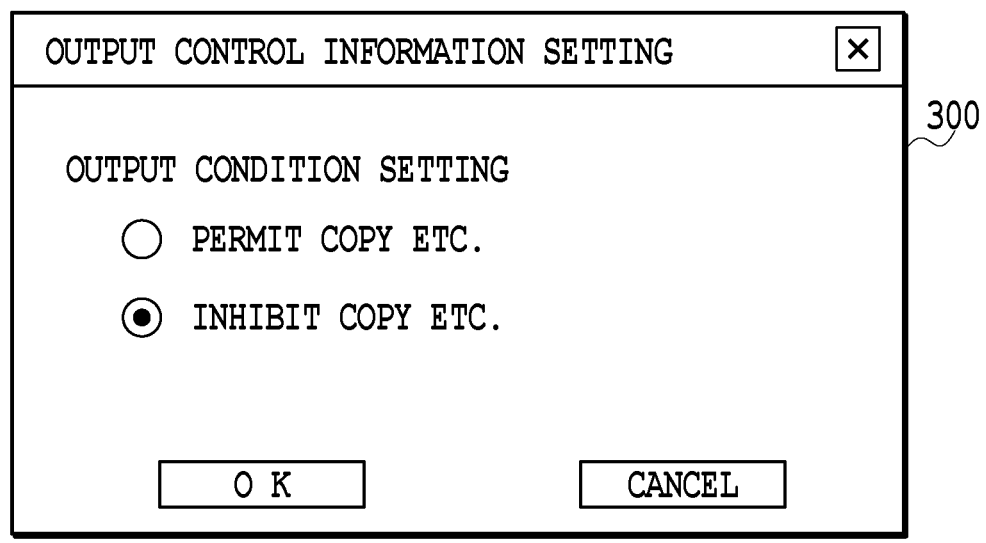
FIG. 3 is a diagram showing an example of a screen to set output control information.

First, as a preparatory stage, a user who wants to attach a QR code to a document makes in advance a setting to attach a QR code to the MFP 100. Specifically, the user selects "Attach QR code" from the alternatives in a various setting selection screen, not shown schematically, displayed on the display unit 108 and selects "Inhibit copy etc." or "Permit copy etc." in an output control information setting screen displayed in response to the selection. FIG. 3 is an example of an output control information setting screen and shows a state where "Inhibit copy etc." is selected. In an output control information setting screen 300, for example, when "Inhibit copy etc." is selected and an OK button is pressed, attachment of output inhibit information to the document data to be output as output control information is set and the content of the setting is saved in the HDD 107. Similarly, when "Permit copy etc." is selected, attachment of output permit information to the document data to be output as output control information is set and the content of the setting is saved in the HDD 107. It may also be possible to make the setting of the attachment of a QR code on a driver or utility of a PC connected via a network.

Figure 2:
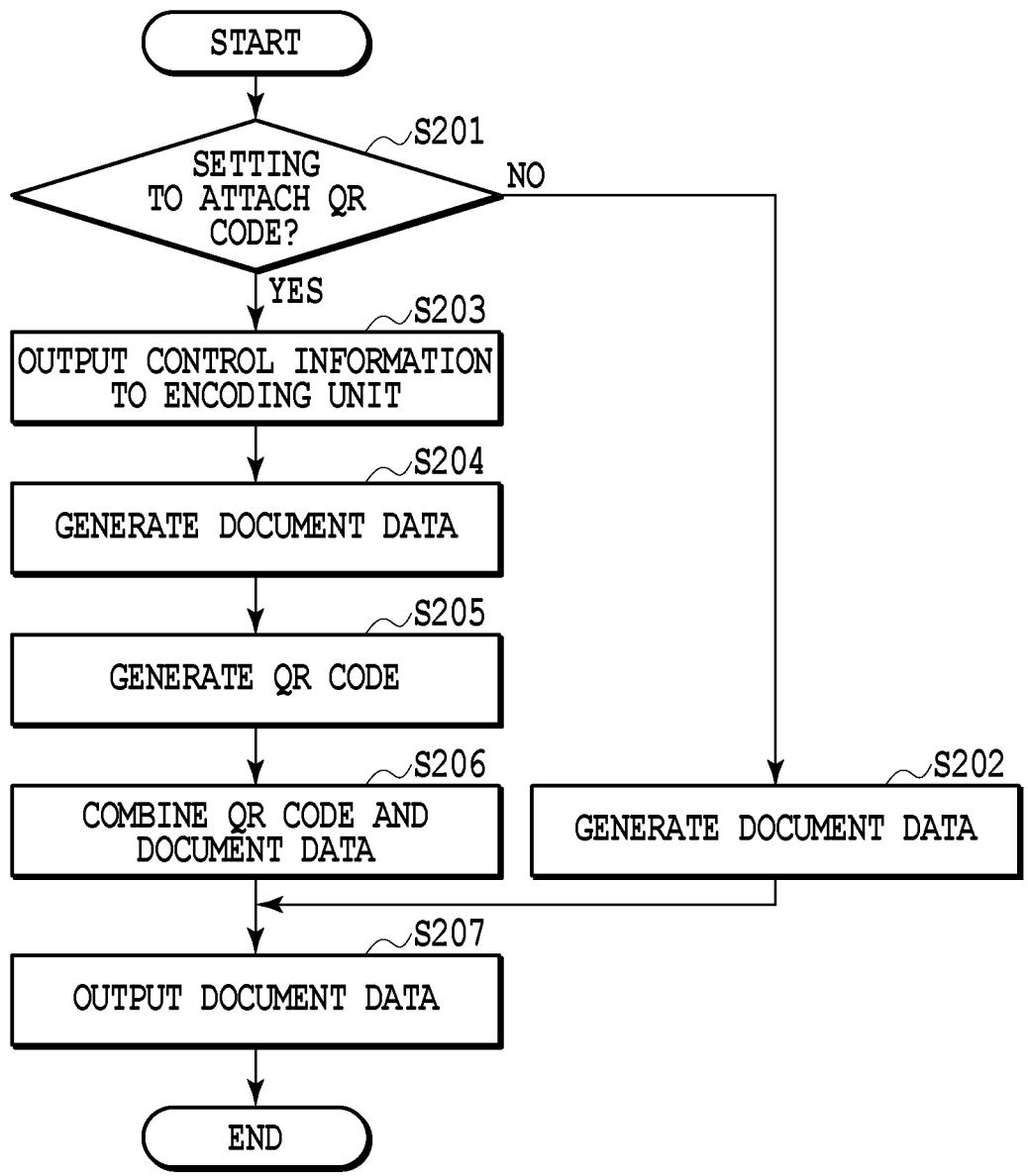
FIG. 2 is a flowchart showing a flow of processing to create a QR code-attached document.

FIG. 2 is a flowchart showing a flow of processing to create a QR code-attached document in the MFP 100.

In step 201, the control unit 101 accesses the HDD 107 and determines whether any setting of attachment of a QR code is made. When it is determined that no setting is made, the process proceeds to step 202. When it is determined that a setting is made, the process proceeds to step 203.

When no setting is made, a document to which no QR code is attached is created as a result. That is, in step 202, the control unit 101 instructs the reading unit 102 to read a document and after the reading unit 102 scans the document to generate document data, the data is subjected to printing processing in step 207 and a document with no QR code is created.

On the other hand, when a setting is made, in step 203, the control unit 101 acquires the content of the setting of QR code attachment from the HDD 107. Then, the control unit 101 sends output control information according to the acquired content of the setting to the encoding unit 110. For example, when the user has selected "Inhibit copy etc." in the output control information setting screen, copy inhibit information is sent to the encoding unit 110 and when the user has selected "Permit copy etc.", copy permit information is sent.

In step 204, the control unit 101 instructs the reading unit 102 to read the document. In response to this, the reading unit 102 scans the document set in the ADF etc. to generate document data. The generated document data is sent to the image processing unit 111 and the information generating unit 104.

In step 205, the control unit 101 instructs the encoding unit 110 to generate a QR code. In response to this, the encoding unit 110 encodes the output control information received in step 203 and converts it into information to be embedded and generates a QR code by further imaging the information to be embedded. The generated QR code is sent to the image processing unit 111.

Figure 4:
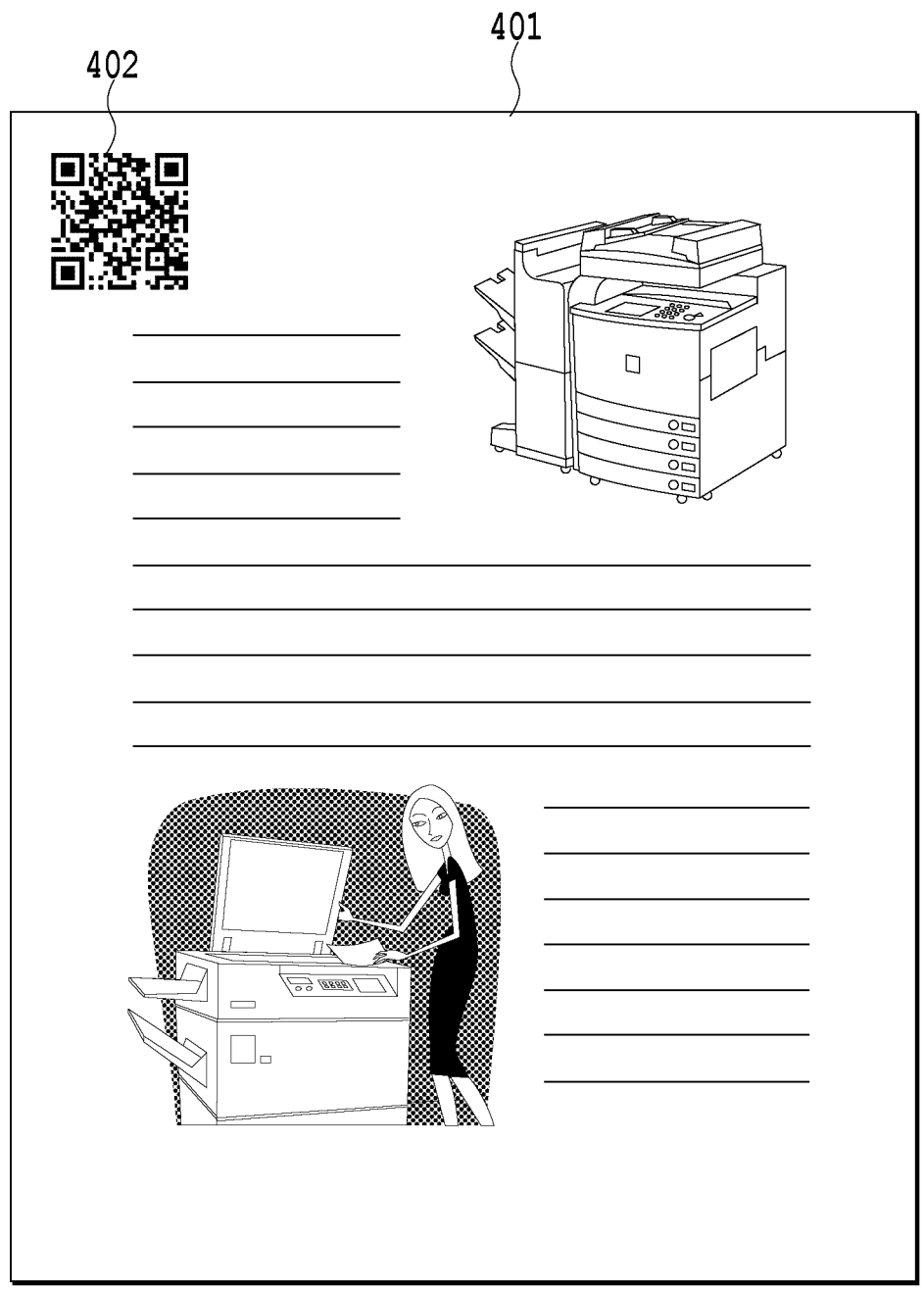
FIG. 4 is a diagram showing an example of document data with which a QR code is combined.

In step 206, when instructed by the control unit 101, the image processing unit 111 combines the QR code and the document data to generate document data combined with a QR code. FIG. 4 shows an example of document data combined with a QR code. To the top-left corner of a document 401, a QR code 402 is attached. The document data combined with a QR code is sent to the memory 106.

In step 207, the control unit 101 sends the document data combined with a QR code to an output destination, for example, the printer unit 109 and the printer unit 109 performs printing processing based on the QR code-attached document data.

In this manner, a document to which a QR code, which is coded output control information, is attached is created.

When a user sets a document including a plurality of sheets of paper (for example, four sheets of paper) in the ADF and instructs to create three copies in total of the QR code-attached document, the same QR code is attached to all the three copies of the document that are created (that is, 12 sheets of paper in total).

Next, the setting of a QR code detection target region according to an output function to be used is explained.

Figure 5A:
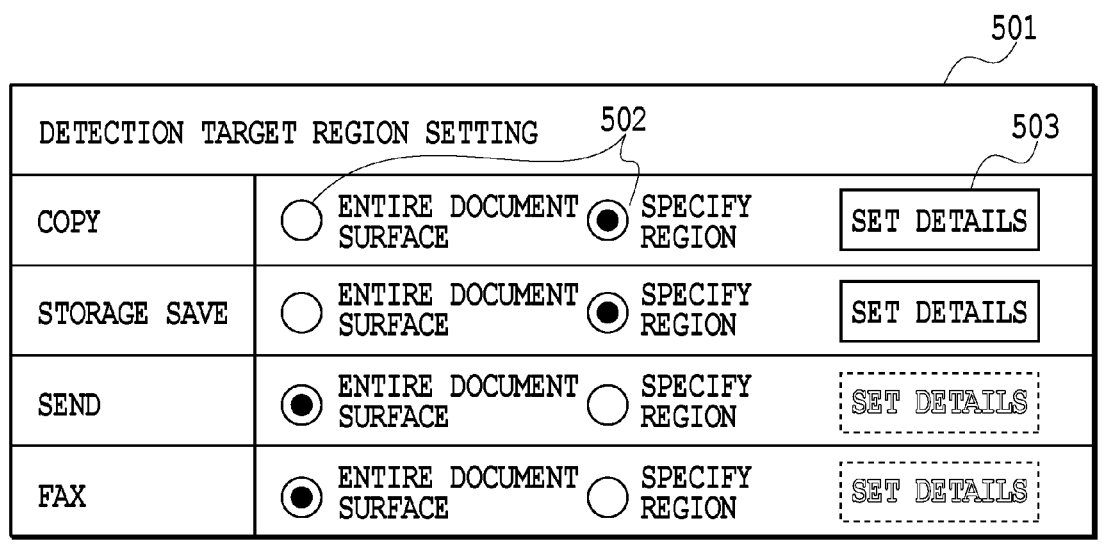
FIGS. 5A to 5C are diagrams showing an example of a setting screen to specify a detection target region of a QR code for each function in a first embodiment.

FIG. 5A shows an example of a setting screen (detection target region setting screen) to specify a QR code detection target region for each function.

It is possible for a user to set a QR code detection target region for each function by checking each check button 502 within a detection target region setting screen 501 via the operation unit 104.

In this case, when the user selects "Specify region", a state is brought about where a "Set details" button 503 can be pressed further. When the user selects "Entire document surface", a setting is made so that the entire surface of the image of the input document data is specified as the QR code detection target region in the state where the "Set details" button cannot be pressed (masked display). In FIG. 5A, the "Specify region" of "COPY" and "STORAGE SAVE" is checked and "Entire document surface" of "SEND" and "FAX" is checked.

Figure 5B:
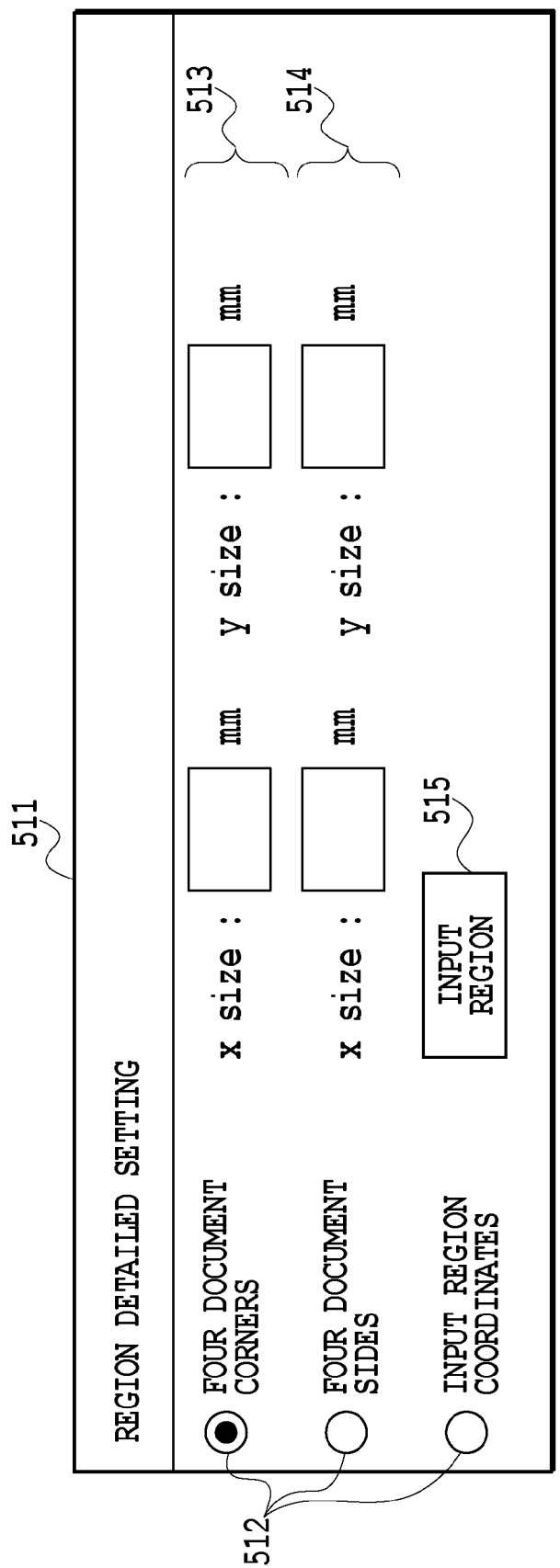

When the user selects "Specify region" and then presses the "Set details" button 503, a region detailed setting screen 511 as shown in FIG. 5B is displayed on the display unit 108.

The user specifies a method of setting a detection target region by checking any of check buttons 512 within the region detailed setting screen 511 via the operation unit 104. In the present embodiment, three kinds of setting method, that is, "Four document corners", "Four document sides", and "Input region coordinates", can be specified as a method of setting a detection target region. They are explained below.

Figure 6B:
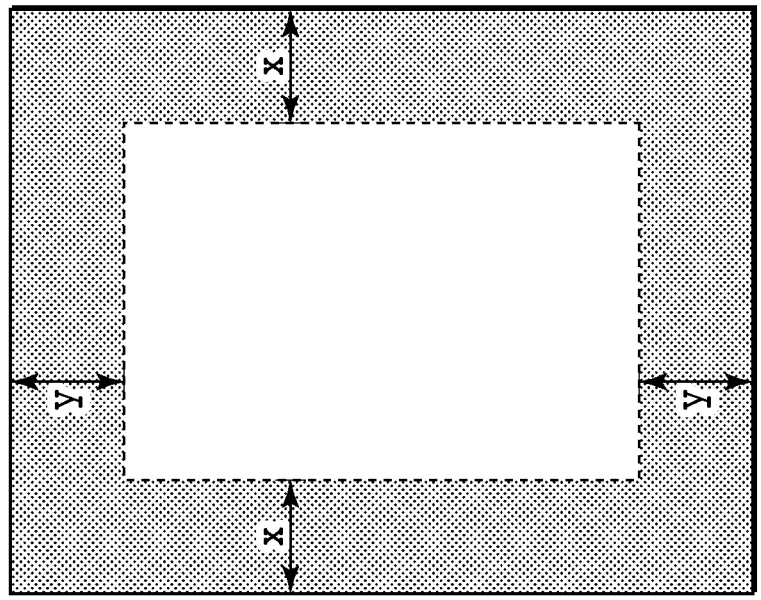
FIGS. 6A and 6B are diagrams showing a detection target region when a region is specified.
Figure 6A:
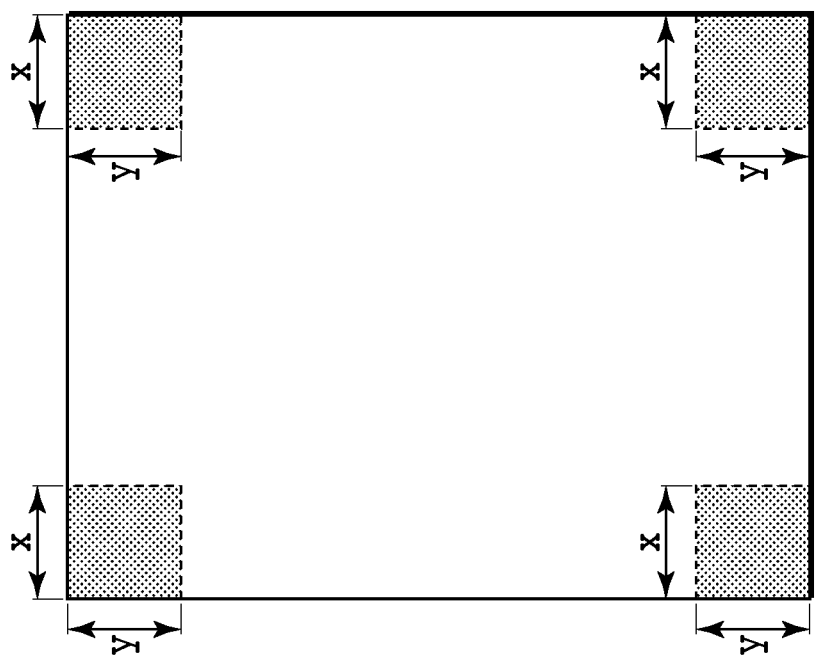

When "Four document corners" is specified, four rectangular regions in total in the top-left corner, bottom-left corner, top-right corner, and bottom-right corner within the image of the document data form the detection target regions. When the user selects "Four document corners", a state is brought about where a size input region 513 can receive an input and a size of width x and a size of height y (for example, values of 50, respectively) of the rectangular regions in the four corners, which are the detection target regions, are input. Here, a size can be input in units of mm, however, this is not limited. FIG. 6A shows the detection target region when "Four document corners" is specified. The values of x and y set in the size input region 513 and the values of x and y in FIG. 6A correspond to each other. The sizes of a document may include various kinds of size, such as A4 and A3, and the regions in the four corners of the document which form the detection target regions are however set automatically from the values of x and y set in the size input region 513.

When "Four document sides" is specified, a region in the shape of a frame composed of a top side, a bottom side, a left side, and a right side and having an arbitrary width within the image of the document data forms the detection target region. When the user selects "Four document sides", a state is brought about where a size input region 514 can receive an input and as in the case of "Four document corners", a size of the width x and a size of the height y of the region along each side of the detection target region are input, respectively. Here, a size can be input also in units of mm, but this is not limited. FIG. 6B shows a detection target region when "Four document sides" is specified. The values of x and y set in the size input region 514 and the values of x and y in FIG. 6B correspond to each other. The sizes of a document may include various kinds of size, such as A4 and A3, and a region in the shape of a frame, which forms a detection target region, is however set automatically from the values of x and y set in the size input region 514.

Figure 5C:
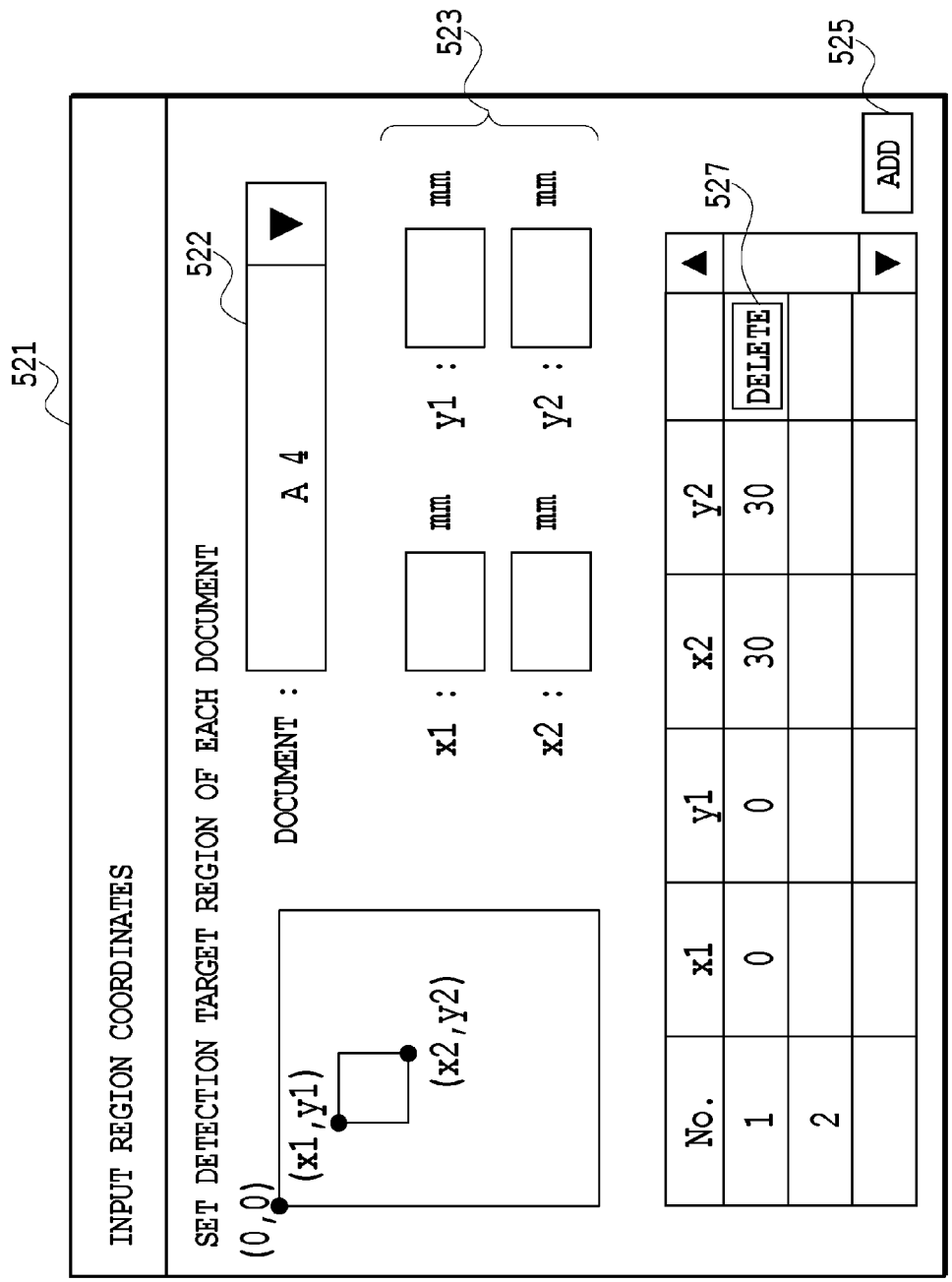

When "Input region coordinates" is specified, an arbitrary region set by a user within the image of the document data forms a detection target region. When the user selects "Input region coordinates", a state is brought about where an "Input region" button 515 can be pressed and when this button is pressed, a region coordinate input screen 521 as shown in FIG. 5C is displayed. In the region coordinate input screen 521, a detection target region can be set for each size of a document and the user selects a document size in a pulldown menu 522. Then, the user inputs coordinates of a desired detection target region in a coordinate input region 523. When arbitrary coordinates are input in the coordinate input region 523, a rectangular region according to the input values is displayed in a coordinate description image 524. The user checks the rectangular region that forms the detection target region by the coordinate description image 524 and presses an additional button 525 when it is OK. Due to this, the rectangular region set uniquely by the user is registered as the detection target region and the coordinate values thereof are displayed in a display list 526. It is possible for a user to register a plurality of rectangular regions that can be set uniquely by the user and all of them can be checked in the display list 526 that can be displayed by scrolling. The values of the input coordinates are deleted by pressing a delete button 527.

Information about the detection target region set by the method described above is saved in the HDD 107.

As a result, it is possible to reduce the processing time required to detect a QR code by setting a limited, narrower region as a detection target region for functions (for example, COPY and STORAGE SAVE) for which performance is considered important and high-speed processing is required. Further, it is also possible to give priority to the detection precision of a QR code by setting a wider region as a detection target region for functions (for example, SEND and FAX) for which accuracy is considered important and careful processing is required.

It may also be possible to give respective default values to the settings described above so that the default values are used when a user does not specify in particular. Further, it may also be possible to make the settings so that only a specific user (for example, system administrator) can change the set values or to set the unique values in advance to a copy machine to prevent any change.

Next, control processing when performing various kinds of output with the MFP 100 using a QR code-attached document, such as when a QR code-attached document is copied, is explained in detail.

Figure 7:
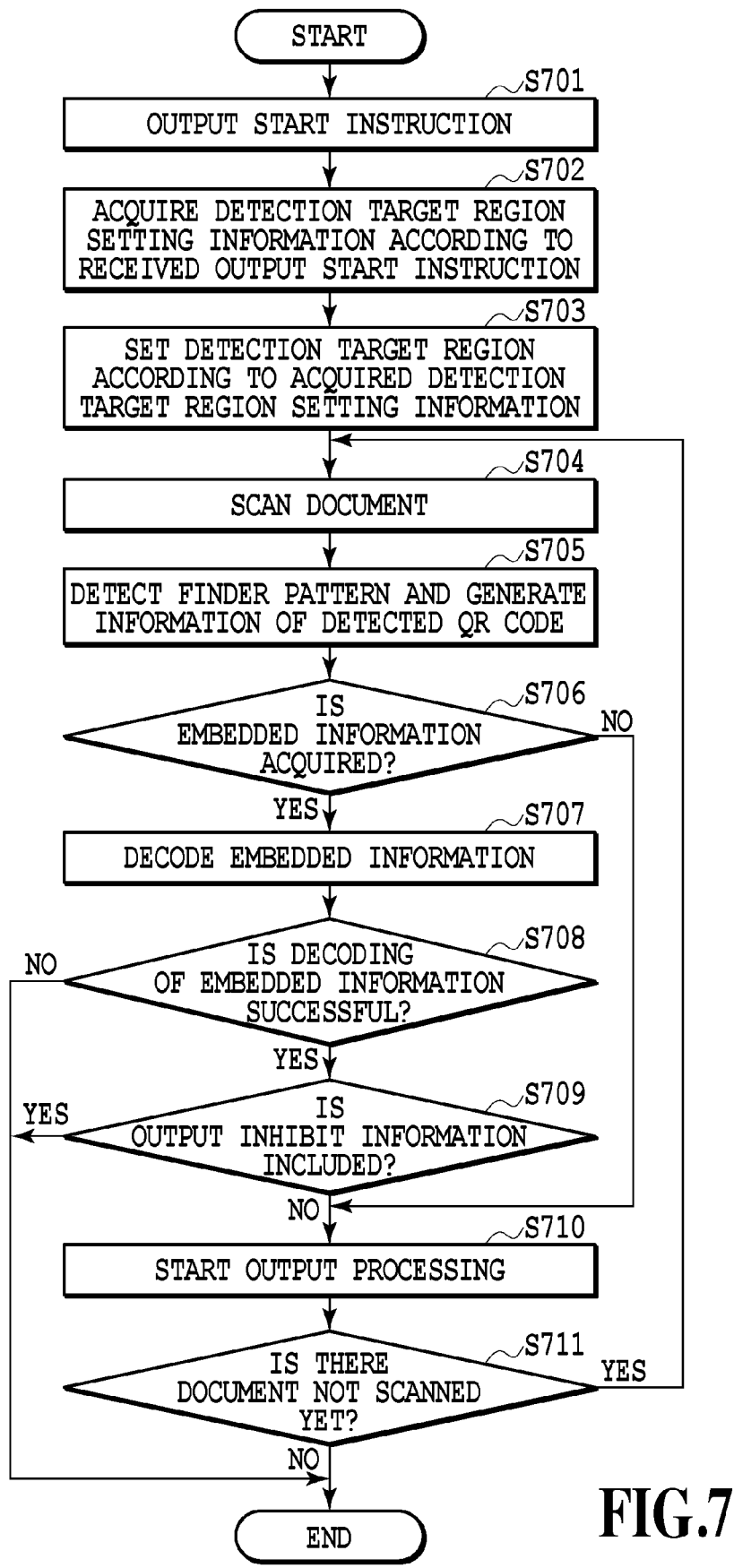
FIG. 7 is a flowchart showing a flow of output control processing in the first embodiment.

FIG. 7 is a flowchart showing a flow of output control processing performed in the MFP 100 according to the present embodiment.

In step 701, the control unit 101 receives an output start instruction from a user. The output start instruction in the present embodiment may include four kinds of instruction, that is, COPY, STORAGE SAVE, SEND, and FAX as a result. Here, it is assumed that COPY is instructed as an output start instruction. Further, it is assumed that "Four document corners", "x size: 50 mm", and "y size: 50 mm" of the region specification are set in advance for COPY and STORAGE SAVE and "Entire document surface" is set in advance for SEND and FAX as detection target region setting information.

In step 702, the control unit 101 acquires the detection target region setting information corresponding to the received output start instruction from the HDD 107. Here, the received output start instruction is COPY, and therefore, as the detection target region setting information corresponding to COPY, each piece of information of "Four document corners", "x size: 50 mm", "y size: 50 mm" of the region specification is acquired. If the received output start instruction is SEND, "Entire document surface" is acquired as a result.

In step 703, the control unit 101 sends the acquired information to the detection target region setting unit 103 and the detection target region setting unit 103 sets a QR code detection target region according to the received information. Here, a rectangular region having a width of 50 mm and a height of 50 mm is set as a detection target region in the four corners of the document.

In step 704, the control unit 101 instructs the reading unit 102 to read the document and in response to this, the reading unit 102 scans the document and generates document data. The generated document data is sent to the information generating unit 104.

In step 705, first, the information generating unit 104 checks the region set in step 703 for the presence/absence of a QR code, more specifically, performs processing to detect a finder pattern. Then, the information generating unit 104 performs information generating processing of the detected QR code to acquire embedded information. It may also be possible to perform processing to detect a finder pattern and the information generating processing of the detected QR code in this step a plurality of times. For example, when the processing is performed 20 times, there is a possibility that up to 20 pieces of embedded information are obtained.

In step 706, the control unit 101 determines whether embedded information is obtained by the information generating processing of the QR code. When embedded information is obtained, the process proceeds to step 707. When embedded information is not obtained, the process proceeds to step 710 and output processing (here, copy printing processing) is started.

In step 707, the control unit 101 decodes the obtained embedded information (when a plurality of pieces of embedded information is obtained, all of them).

In step 708, the control unit 101 determines whether the decoding of the embedded information is successful. When successful, the process proceeds to step 709. When unsuccessful (when a plurality of pieces of embedded information is obtained, decoding of all of them is unsuccessful), the procedure is aborted without performing output processing (here, copy printing processing).

In step 709, the control unit 101 determines whether output inhibit information is included in the decoded embedded information. When output inhibit information is included, the procedure is aborted without performing output processing (here, copy processing). When output inhibit information is not included (or output permit information is included), the process proceeds to step 710.

In step 710, the control unit 101 instructs each unit in charge of output instructed by a user to output document data. Here, the control unit 101 instructs the printer unit 109 to perform copy printing processing of the document data. In response to this, the printer unit 109 prints and outputs the document data on a recording medium (paper). By the output instruction from the control unit 101, the document data is sent to each unit in charge of output, however, it is needless to say that the document data at that time is data having been subjected to necessary imaging processing (for example, halftone processing etc.).

In step 711, the control unit 101 determines whether a document that is not scanned yet by the reading unit 102 is left in the ADF etc. When a document that is not scanned is left, the process returns to step 704. When any document that is not scanned is not left, the processing is completed.

By the above-described output control processing, it is made possible to switch the QR code detection target regions for each function used by a user. Then, the QR code detection target region set for each function can be changed arbitrarily, and therefore, it is possible to perform flexible operation of output control in accordance with the characteristics etc. of the function to be used.

Second Embodiment

There can be supposed a case where a malicious user cuts out or blots out a QR code and the output control by a QR code is no longer available when a QR code is attached to a specifically limited position of a document. In view of such a case, there is an MFP capable of setting an operation mode in which if no QR code is detected in a document, any output of the document data is inhibited (hereinafter, such an operation mode is referred to as a "secure mode" and a general operation mode other than the secure mode is referred to as a "normal mode"). Here, an aspect in which the detection target regions are switched depending on whether the operation mode of the MFP is the secure mode or the normal mode is explained as a second embodiment.

Figure 8:
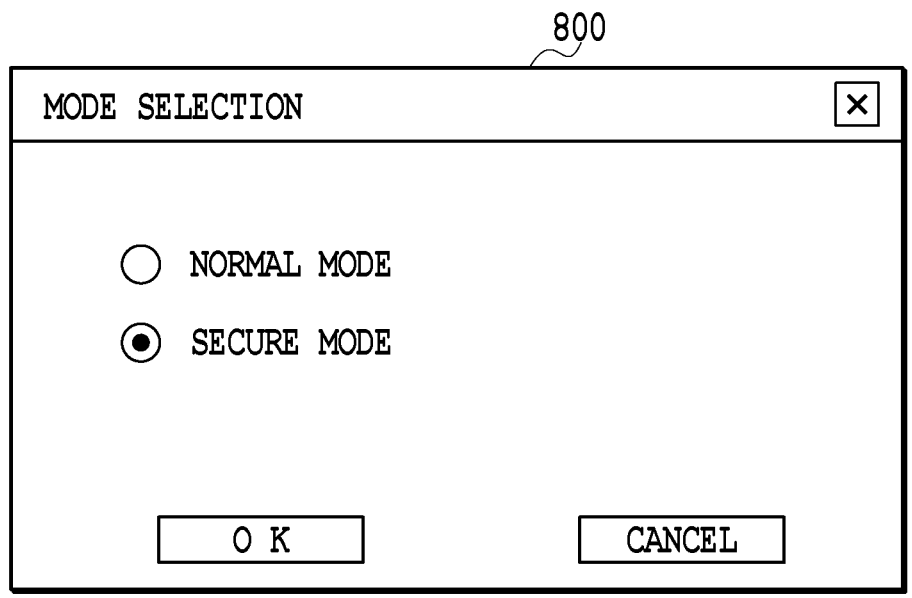
FIG. 8 is a diagram showing an example of a mode selection screen.

A user who wants to use the MFP 100 in the secure mode makes a setting in advance to validate the secure mode to the MFP 100. Specifically, the user selects "Set output control operation mode" from the alternatives in a various setting selection screen, not shown schematically, displayed on the display unit 108 and removes the check mark of "Normal mode" in a mode selection screen 800 displayed in response to the selection and checks "Secure mode". FIG. 8 is an example of the mode selection screen and shows a state where "Secure mode" is selected. In this state, when the OK button is pressed, the secure mode is validated as the setting of the operation mode of output control.

Figure 9:
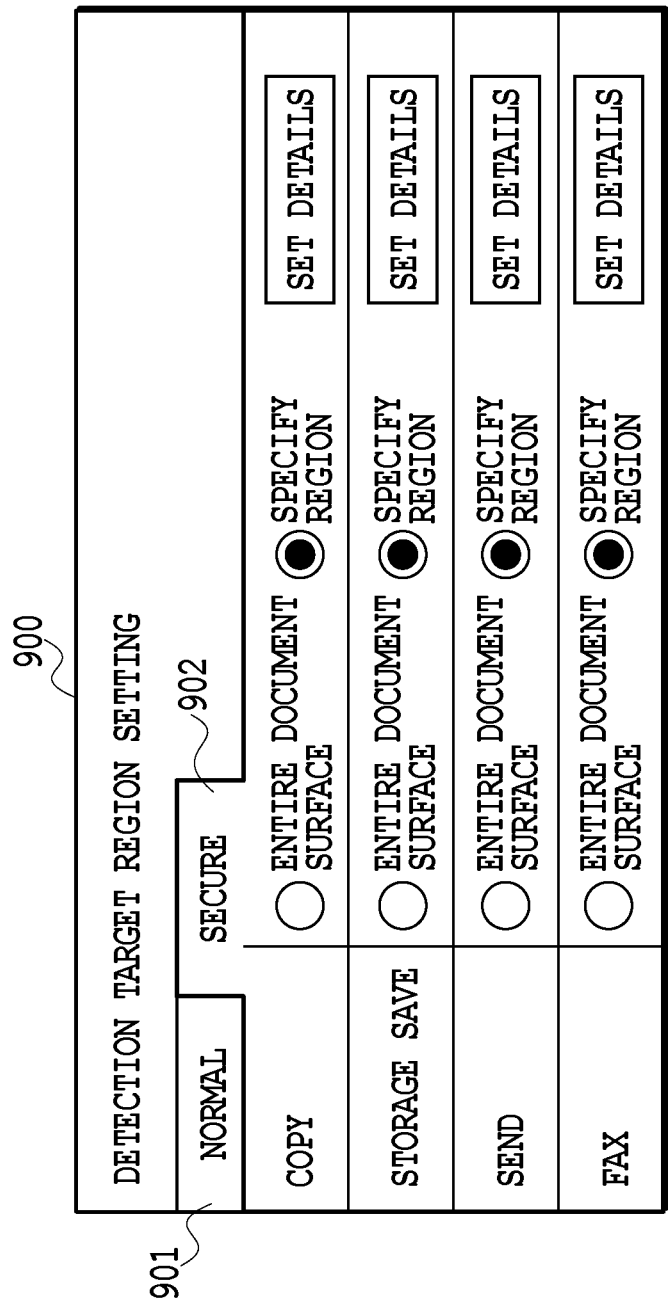
FIG. 9 is a diagram showing an example of a setting screen to specify a detection target region of a QR code for each operation mode in a second embodiment.

Further, the user is required to set a QR code detection target region in advance for each function in the secure mode. FIG. 9 shows an example of the detection target region setting screen in the present embodiment. A detection target region setting screen 900 internally includes two tabs (normal tab 901 and secure tab 902) that do not exist in the detection target region setting screen 501 in FIG. 5A according to the first embodiment. Due to these tabs, it is made possible to set the detection target region for each function separately in the normal mode and the secure mode. In the example in FIG. 9, "Specify region" is specified as the detection target region in the secure mode for all the functions and for "Set details", although not shown schematically, "Four document corners" is selected. In the case of SEND and FAX also, "Specify region" is specified because output is inhibited if no QR code is detected in the secure mode, and therefore, an attempt to improve performance is made by limiting the detection target region. Other points are the same as those in the first embodiment, and therefore, their explanation is omitted.

Next, control processing when performing various kinds of output with the MFP 100 using a QR code-attached document in the present embodiment is explained in detail.

Figure 10:
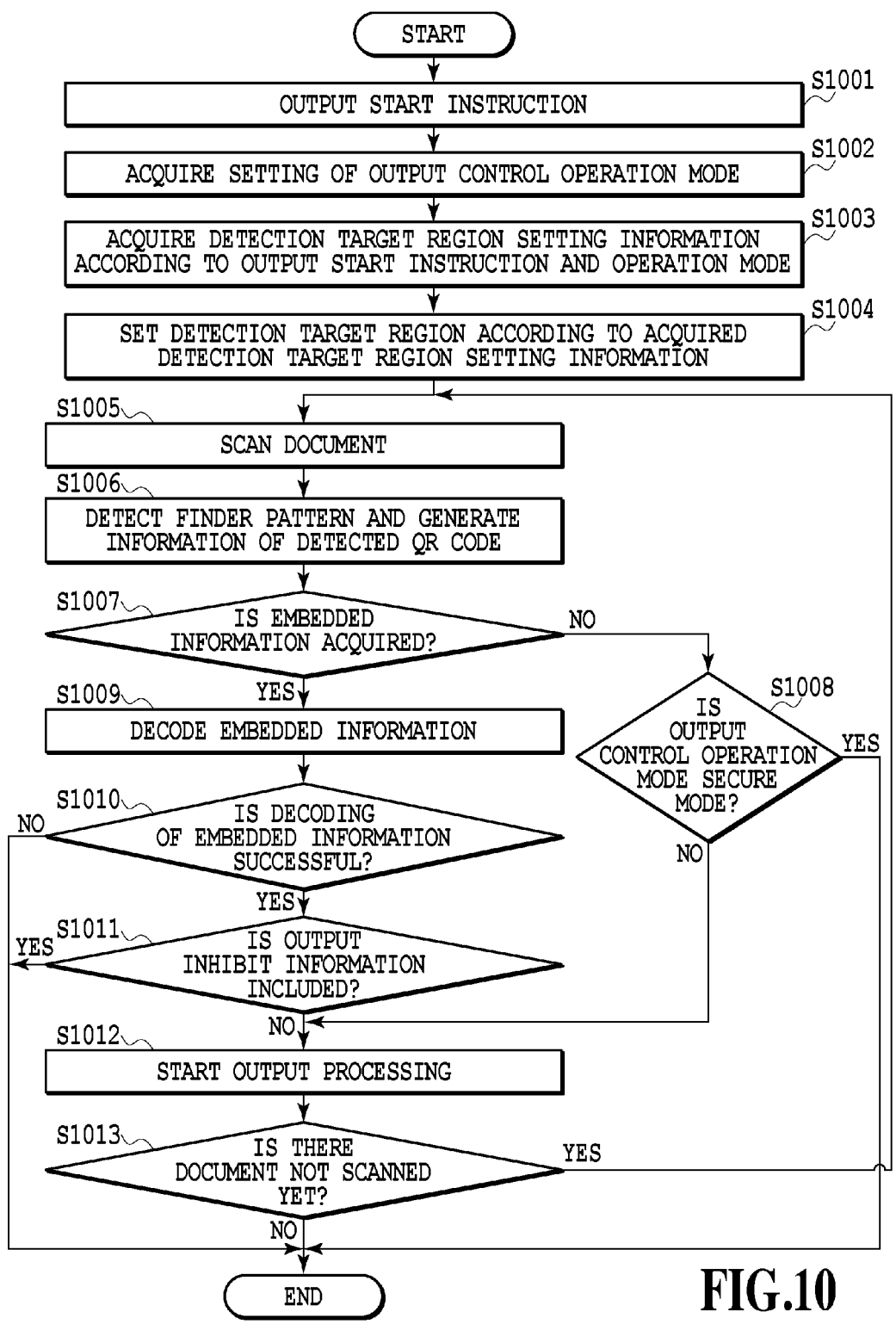
FIG. 10 is a flowchart showing a flow of output control processing in the second embodiment.

FIG. 10 is a flowchart showing a flow of output control processing performed in the MFP 100 according to the present embodiment. Explanation of the parts common to the flowchart in FIG. 7 according to the first embodiment is simplified or omitted and here, different points are explained mainly.

In step 1001, upon receipt of an output start instruction from a user, the control unit 101 acquires information about the operation mode of output control set in advance from the HDD 107 in step 1002. Here, it is assumed that the setting is made so that "Secure mode" is validated and information thereabout is acquired.

In step 1003, the control unit 101 acquires information about the detection target region setting from the HDD 107 based on the received output start instruction and the acquired information about the operation mode.

In step 1004, the detection target region setting unit 103 sets a QR code detection target region and the reading unit 102 scans the document to generate document data in step 1005. Then, in step 1006, the information generating unit 104 performs processing to detect a finder pattern and information generating processing of the detected QR code.

In step 1007, the control unit 101 determines whether embedded information is obtained and when embedded information is obtained, the process proceeds to step 1009. When embedded information is not obtained, the process proceeds to step 1008.

In step 1008, the control unit 101 determines whether or not the setting of the operation mode of output control is the secure mode. When the setting of the operation mode is determined to be not the secure mode (determined to be the normal mode), the process proceeds to step 1012 and output processing is started. On the other hand, when the setting of the operation mode is determined to be the secure mode, the processing is aborted. That is, because no embedded information is obtained, there is a possibility that the QR code has been deleted etc. in an unauthorized manner by a malicious user, and therefore, the present processing is aborted without performing output processing.

Each processing in step 1009 to step 1013 is the same as that in step 707 to step 711 in FIG. 7, and therefore, its explanation is omitted.

As described above, according to the MFP 100 in the present embodiment, it is possible to switch the detection target regions in accordance with the operation mode of output control and it is possible to perform flexible output control while preventing an unauthorized output by a user.

Third Embodiment

As a method of scanning a document in the reading unit 102, mention is made of a system in which a reading unit itself moves on the surface of a stationary document placed and fixed and scans the document and a system in which a document conveyed at a constant speed is scanned by a fixed reading unit.

In the former system (hereinafter, referred to as a "flatbed system"), a user places a document directly on the platen, and therefore, if the document is inclined or misaligned considerably when placed, the inclination or misalignment directly affects the result of reading. For example, when the QR code detection target region is set to "Four document corners" or "Four document sides", there may be a case where the QR code cannot be detected in the region because of the serious misalignment and output control information is ignored as a result.

On the other hand, in the latter system (hereinafter, referred to as a "sheet feed system"), reading is performed while a document is moving at a constant speed from the ADF, and therefore, as long as a document is set to the ADF correctly, a serious misalignment (for example, ±1 cm or more with respect to the feeder) is hard to occur at the time of reading. Because of that, even when the detection target region is set to "Four document corners" or "Four document sides", the QR code is detected without fail from the region and it is possible to extract output control information without any trouble.

Because of the above, an aspect in which the detection target regions are switched in accordance with the reading system to be used in the MFP 100 comprising the reading unit 102 capable of scanning by both the systems is explained as a third embodiment.

FIG. 11 shows an example of a detection target region setting screen in the present embodiment. A detection target region setting screen 1100 is divided into a flatbed setting area 1101 and a sheet feed setting area 1102 and a detection target region can be set for each function in the respective areas. Other points, such as the content of the setting and the setting method, are the same as those in the first embodiment, and therefore, their explanation is omitted.

Next, control processing when performing various kinds of output with the MFP 100 using a QR code-attached document in the present embodiment is explained in detail.

Figure 12:
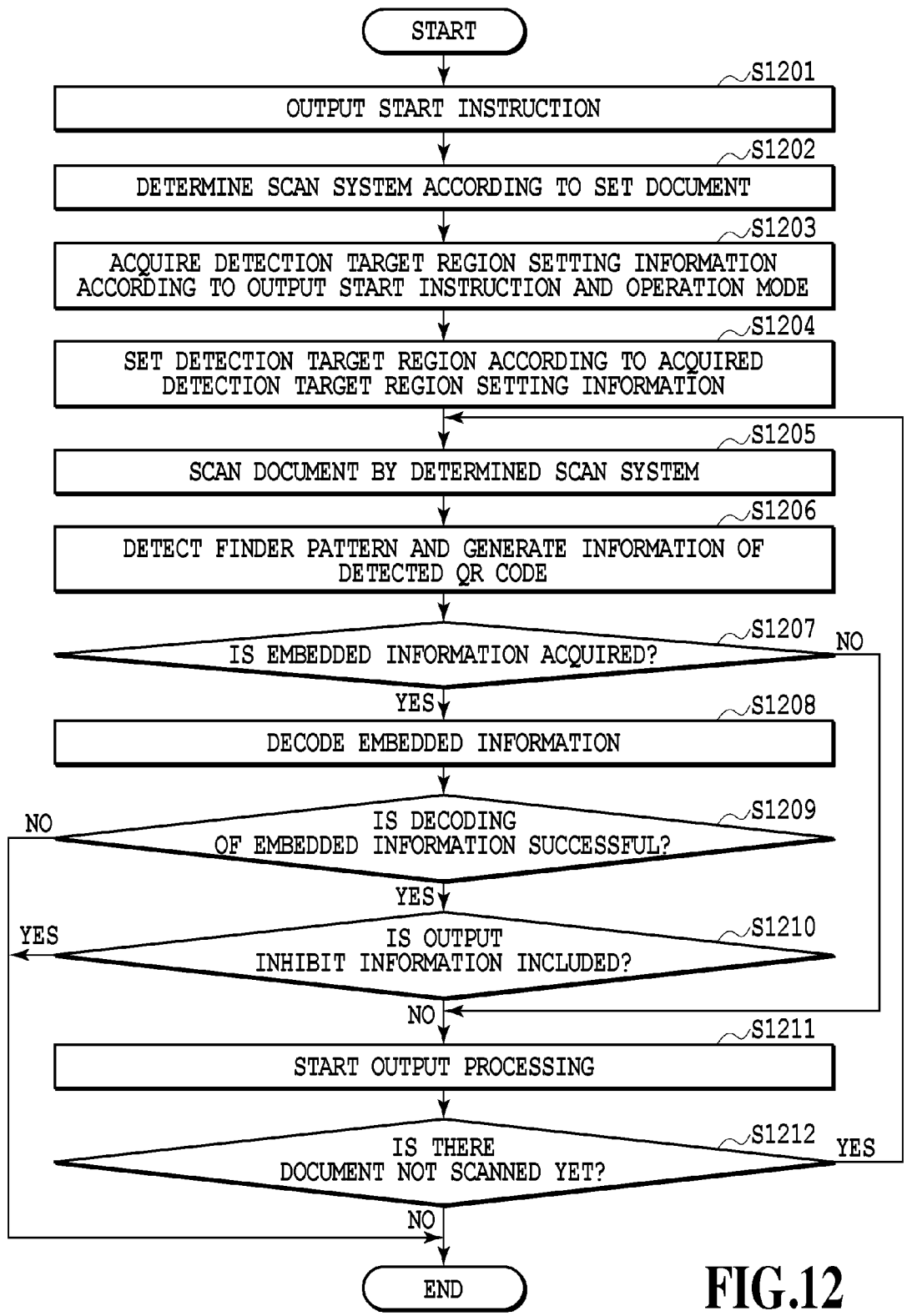
FIG. 12 is a flowchart showing a flow of output control processing in the third embodiment.

FIG. 12 is a flowchart showing a flow of output control processing performed in the MFP 100 according to the present embodiment. The explanation of the parts common to the flowchart in FIG. 7 according to the first embodiment is simplified or omitted and here, different points are explained mainly.

In step 1201, upon receipt of an output start instruction from a user, in step 1202, the control unit 101 determines a reading system used in step 1205 according to where a document is set. Specifically, the control unit 101 detects where a document is set using a paper sensor, not shown schematically, and determines the flatbed system when the document is placed directly on the platen or the sheet feed system when the document is set in the ADF.

In step 1203, the control unit 101 acquires detection target region setting information from the HDD 107 based on the received output start instruction and the determined reading system.

When the detection target region setting unit 103 sets a QR code detection target region in step 1204, the reading unit 102 scans the document by the determined reading system and generates document data in step 1205.

Each processing in step 1206 to step 1212 is the same as that in step 705 to step 711, and therefore, its explanation is omitted.

As described above, according to the MFP 100 in the present embodiment, it is possible to switch the detection target regions according to the reading system of the reading unit 102 and it is possible to perform more flexible output control.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-132908, filed Jun. 10, 2010, which is hereby incorporated by reference herein in its entirety.

What is claimed is:

1. A printing device comprising:
at least one processor; and
at least one memory,
wherein the at least one memory stores a program that, upon execution by the at least one processor, causes the at least one processor to perform the functions of:
a receiving unit that receives an output start instruction for an image from a user;
a determining unit that determines a detection target region of the image based on a type of the output start instruction received from the user;
a detection unit that detects a two-dimensional code from the determined detection target region of the image;
a permission determining unit that determines whether or not output of the image is permitted based on the detected two-dimensional code; and
an output unit that either transmits the image to another device or prints the image, in accordance with the received output start instruction, when output of the image is determined to be permitted;
wherein the output unit prints the image in a case where the type of the received output start instruction is printing and output of the image is determined to be permitted, and transmits the image to another device in a case where the type of the received output start instruction is transmitting and output of the image is determined to be permitted.

2. The printing device according to claim 1, wherein a first region is determined to be the detection target region in a case that the type of the received output start instruction is transmitting and a second region smaller than the first region is determined to be the detection target region in a case that the type of the received output start instruction is printing, wherein the first region includes the second region.

3. A printing device comprising:
at least one processor; and
at least one memory,
wherein the at least one memory stores a program that, upon execution by the at least one processor, causes the at least one processor to perform the functions of:
a read unit having a reading system and being configured to read a document to obtain an image;
a setting unit configured to set selectively one of a first region and a second region smaller than the first region as a detection target region of the image based on a type of the reading system; and
a detection unit configured to detect a two-dimensional code from the set detection target region of the image,
wherein the first region is set as the detection target region by the setting unit in a case that the reading system is a flatbed system, and the second region is set as the detection target region by the setting unit in a case that the reading system is a sheet feed system.

4. The printing device according to claim 3, wherein the first region includes the second region.

5. The printing device according to claim 4, wherein the first region is set as the detection target region in a case where the method of reading the document used by the read unit is a flatbed system, and the second region is set as the detection target region in a case where the method of reading the document used by the read unit is a sheet feed system.

6. A method of controlling a device for reading an image, the method comprising:
receiving an output start instruction for the image from a user;
determining a detection target region of the image based on a type of the output start instruction received from the user;
detecting a two-dimensional code from the determined detection target region of the image;
determining whether output of the image is permitted based on the detected two-dimensional code; and
outputting the image by either transmitting the image to another device or printing the image, in accordance with the received output start instruction, when output of the image is determined to be permitted,
wherein the outputting step prints the image in a case where the type of the received output start instruction is printing and output of the image is determined to be permitted, and transmits the image to another device in a case where the type of the received output start instruction is transmitting and output of the image is determined to be permitted.

7. A method of controlling a device for reading an image, the method comprising:
    reading a document to obtain an image;
    selectively setting one of a first region and a second region smaller than the first region as a detection target region of the image based on a type of the reading system; and
    detecting a two-dimensional code from the set detection target region of the image,
    wherein the first region is set as the detection target region in the setting step, in a case that the reading system used by the reading step is a flatbed system, and the second region is set as the detection target region in the setting step, in a case that the reading system used by the reading step is a sheet feed system.

* * * * *